United States Patent

Keller

[15] 3,701,052

[45] Oct. 24, 1972

[54] METHOD OF AMPLITUDE CONTROL OF ELECTROMECHANICAL OSCILLATORS

[72] Inventor: Hans Keller, Freiburg, Germany

[73] Assignee: ITT Industries, Inc., New York, N.Y.

[22] Filed: July 15, 1971

[21] Appl. No.: 162,882

[30] Foreign Application Priority Data

July 22, 1970 Germany..........P 20 36 330.8

[52] U.S. Cl.............331/116 M, 58/23 A, 58/23 AD, 331/109

[51] Int. Cl................................................H03b 5/36

[58] Field of Search...................331/116, 109; 58/23

[56] References Cited

UNITED STATES PATENTS 3,530,662 9/1970 Schoninger................331/116

*Primary Examiner*—John Kominski

*Attorney*—C. Cornell Remsen, Jr. et al.

[57] ABSTRACT

This is a method and circuit for controlling electromechanical oscillators in electronic watches which are excited by a circuit containing only one driving coil. The voltage which is induced in the coil by the oscillator is used as a measure for controlling the width of the exciting pulse.

4 Claims, 5 Drawing Figures

INVENTOR

HANS KELLER

BY Stephen A. Young

ATTORNEY

INVENTOR

HANS KELLER

BY Stephen A Young

ATTORNEY

INVENTOR

HANS KELLER

BY Stephen A. Young

ATTORNEY

METHOD OF AMPLITUDE CONTROL OF ELECTROMECHANICAL OSCILLATORS

BACKGROUND OF THE INVENTION

The present invention relates to a circuit for automatically controlling the oscillation amplitude of mechanical oscillators (balance wheel, tuning fork, pendulum, etc.) for the driving via only one single coil which is energized by an electronic circuit comprising one driving transistor and one control transistor which is complementary thereto, and which is inserted in the collector branch of the driving transistor, with the base of the driving transistor being supplied with the collector current of the control transistor, and the base of the control transistor being connected via electronic circuit elements, to the collector of the driving transistor.

For maintaining the oscillation of electromechanical oscillators used, for example, in clocks and watches as balance wheels, tuning forks, pendula, etc., it is known to use electronic transistor circuits. These circuits may be divided into two classes, namely into those maintaining the mechanical oscillation with the aid of two coils — one control coil and one driving coil — and those requiring only one single (driving) coil.

In both driving principles the keeping constant of the oscillation amplitude of the mechanical oscillator plays an important part, because the oscillation amplitude thereof has a substantial influence upon the accuracy of the clock or watch. On the other hand, however, the oscillation amplitude is dependent upon quite a number of external influences, such as the ambient temperature, the spatial position of the clock, (especially of importance of importance to wrist watches), the battery voltage, etc.

The keeping constant of the oscillation amplitude is already customary in the case of two-coil circuits and is not encountered by any special difficulties from the circuit-technical point of view.

In the case of single-coil circuits, however, the keeping constant of the oscillation amplitude of the mechanical oscillator if effected in the electronic way, causes some difficulties.

One such circuit is shown in FIG. 1 of the accompanying drawings. The coil L is applied on one hand to the battery voltage $-U_B$ and with its other end, to the collector of the driving transistor T1 whose base is controlled by the collector current of the complementary transistor T2. The emitter of the control transistor T2, if so required, via a feedback resistor R1, is connected to the battery voltage $-U_B$. The base of the control transistor T2 is coupled to the circuit ground via resistor R2, and is connected via a coupling network K to the collector of the driving resistor T1. The base current of the control transistor T2 flows through resistor R2, which current is required for starting the circuit to oscillate. The coupling network may consist of a capacitor or a resistor or a diode, or else of a combination of these elements (cf. German published applications (DOS) 1,448,348 and 1,931,507; German printed application (DAS) 1,166,101; French published application No. 2,000,706 and "Jahrbuch der Deutschen Gesellschaft fuer Chronometrie", Vol. 20/1, Stuttgart 1970, page 17 et seq.).

This conventional circuit is suitable for single- as well as for multi-magnet systems, i.e. with the coil L, one or more magnet pole pairs may cooperate in maintaining the mechanical oscillations, in which case either the coil is stationary and the magnets with the oscillator are movable, or in which the magnets are stationary and the coil with the oscillator is movable. For simplifying the representation, there will now be considered a single-magnet system. In this system, in the transient state, the voltage at the collector of the operating transistor T1 has a curve with respect to time as shown in FIG. 2. The voltage $u_i$ with the peak value $\hat{u}_i$ as induced therein owing to the relative movement between the magnet and the coil, reaches after the zero crossover the operating threshold $U_S$ of the control transistor T2, so that both transistors are rendered conductive.

Accordingly, during the time $t_1$ the operating transistor T1 is driven into saturation, and a current will flow through the coil L. Magnitude of this current and, consequently, the energy as applied to the oscillating system, are dependent among others, upon the battery voltage. Owing to this dependence the oscillation amplitude increases as the battery voltage decreases, thus affecting the accuracy. Apart therefrom, the oscillation amplitude is influenced by quick positional variations, for example, in the case of wrist watches or car clocks.

SUMMARY OF THE INVENTION

It, therefore, is the object of the present invention, by providing suitable circuit measures, to control the influence of the battery voltage and other environmental influences upon the oscillation amplitude.

The induced voltage in the coil may serve as a measurement for the oscillation amplitude. It is not possible to use the induced voltage as a measurement for control at the time when the operating transistor is driven into saturation, because across the coil in single-coil circuits there is an additional voltage drop across the ohmic resistance of the coil owing to the collector current of the driving transistor.

The method described in detail hereinbefore, serves to solve this problem in that to at least one of the two control electrodes (base or emitter) of the control transistor there is applied a d.c. biasing potential whose magnitude, by at least a two-stage control circuit, is dependent upon the peak value of the voltage freely induced in the coil, and with an increasing peak value of the freely induced voltage the operating threshold of the stage containing the control transistor is enlarged, thus reducing the time of current flow in the coil.

By the term "freely induced voltage" as used in connection with the present invention, there is to be understood that particular voltage as induced in the coil and which, in the case of a blocked driving transistor T1, serves to increase the collector-emitter voltage thereof to a value exceeding that of the battery voltage.

Moreover, the present invention relates to circuit arrangements for carrying out the inventive method, which are characterized by the fact that in the case of a two-stage control circuit the latter consists of two complementary transistors the first of which being of the same conductivity type as the control transistor and connected with its base to the battery-voltage-sided end of the coil and with its emitter — if necessary across a resistor — to the other end of the coil, and the second of which being of the same conductivity type as the driving transistor and connected with its base to the collector of the first transistor and with at least one of its other electrodes to a parallel RC circuit which either, with its one end, is applied to earth or mass potential (i.e. the zero point of the circuit) and with its other end across a resistor, to the base of the control transistor, or with its one end to battery voltage and with its other end to the emitter of the control transistor.

DESCRIPTION OF THE PREFERRED EMBODIMENTS

Figure 1:
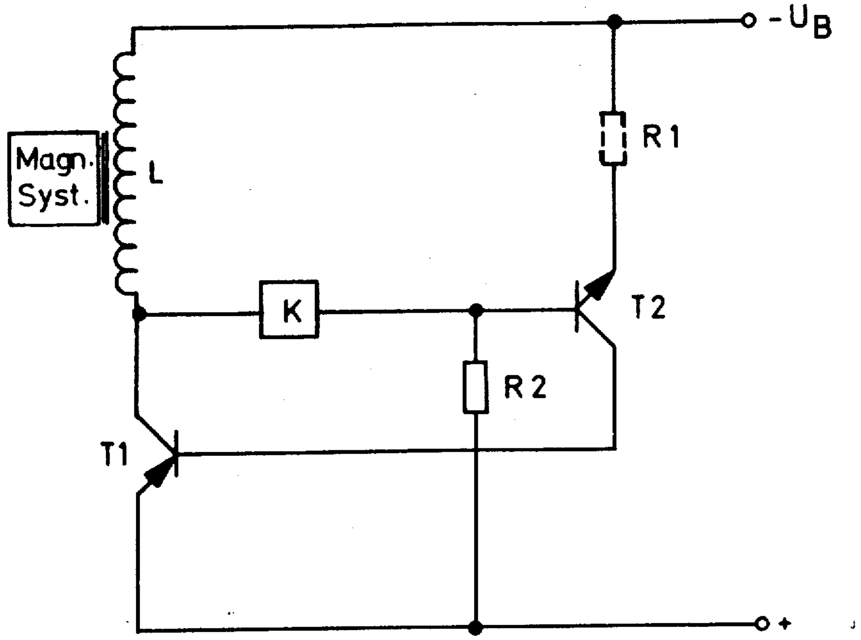
FIG. 1 shows the prior art circuit.
Figure 2:
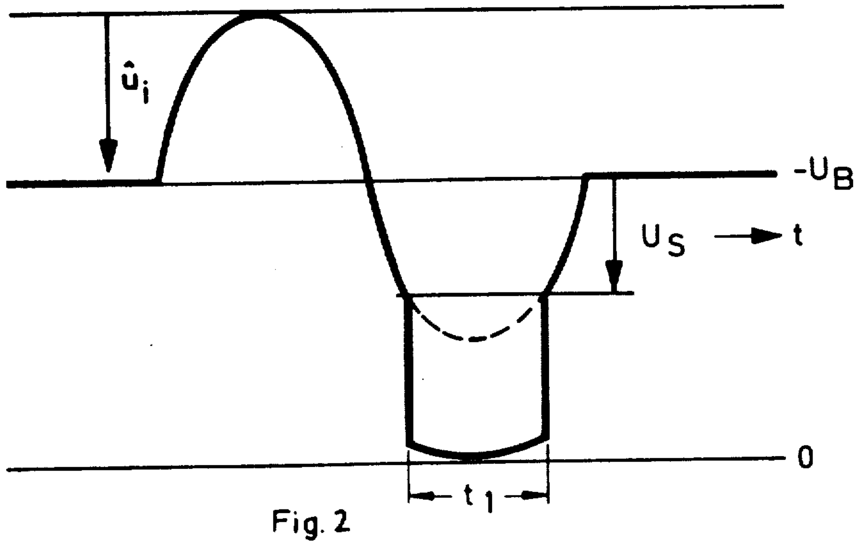
FIG. 2 shows the voltage across the operating transistor of FIG. 1.
Figure 3:
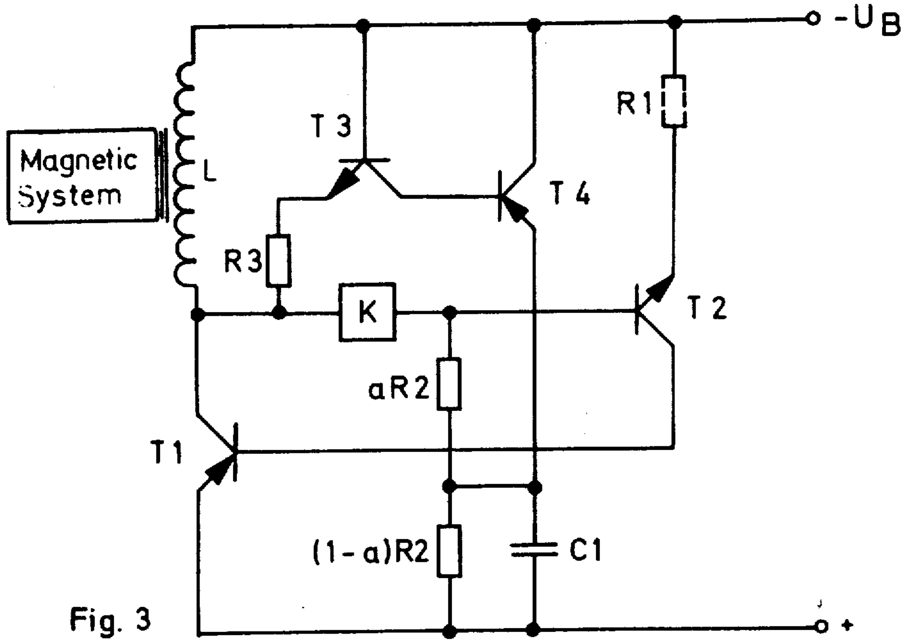
FIGS. 3 to 5 show separate embodiments of the inventive circuit.

The circuit arrangement shown in FIG. 3 illustrates the circuit according to FIG. 1 which has been enlarged by the portion serving the amplitude control. The resistor R2 connecting the base of the control transistor to the circuit ground, is subdivided into two partial resistors *a*R2 and (1-*a*) R2, with the latter partial resistor being bridged by the parallel-arranged capacitor C1. The letter *a* is in this case intended to define any arbitrary number smaller than unity.

The first transistor T3 of the control circuit portion, which is of the same conductivity type as the control transistor T2, has its base connected to the battery voltage $U_B$, its emitter coupled via resistor R3 to the collector of the driving transistor T1. The emitter of transistor T3 may also be connected directly to the collector of the operating transistor T1. The collector of first transistor T3 is connected to the base of the second transistor T4 of the control circuit portion. The collector of transistor T4 is connected to the battery voltage $U_B$, while the emitter thereof is connected to the end of the parallel-RC-circuit, (1-*a*) R2, C1 not facing the circuit ground.

Figure 4:
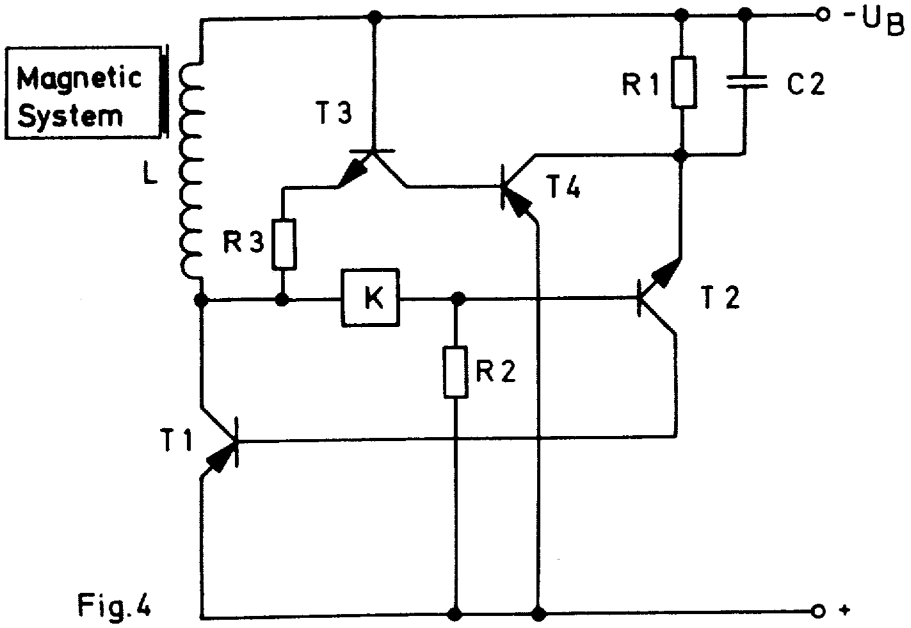

The circuit arrangement according to FIG. 4 differs from that according to FIG. 3 in that the resistor R2 is not divided, that the resistor R1 is connected in parallel with a capacitor C2, and that the emitter of transistor T4 is connected to the circuit ground, while the collector thereof is connected to the end of the parallel-RC-circuit R1, C2 not facing the battery voltage source.

Figure 5:
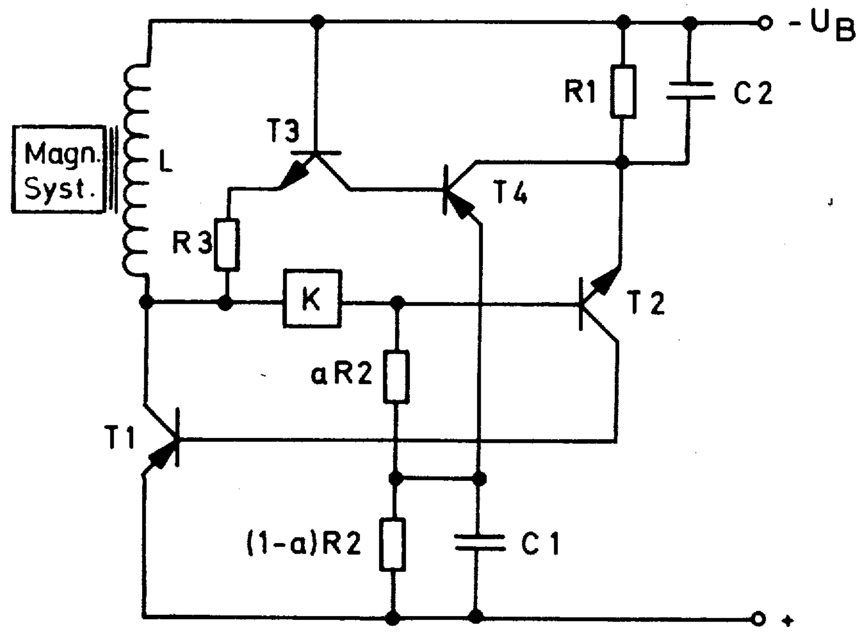

The circuit arrangement shown in FIG. 5 combines the circuit arrangements according to FIGS. 3 and 4 in such a way that the emitter of transistor T4 is connected to the parallel-RC-circuit (1-*a*) R2, C1, and the collector of the same transistor is applied to the parallel-RC-circuit R1, C2.

The fundamental mode of operation of these circuit arrangements will now be described with reference to FIG. 3. In the steady and controlled state a pulse current which is predetermined by the magnitude of the voltage freely induced in the coil and by the values of the components is flowing through the collector-emitter path of the transistor T3 and, consequently, to an increased extent via the collector-emitter path of transistor T4. This current causes a certain average voltage to be created across the capacitor C1. This voltage is co-determinative of the operating threshold of the control transistor T2. If now, owing to any arbitrary environmental influence, for instance, a shock or impact or a variation of the battery voltage, the mechanical oscillator is excited up to a higher amplitude, then also a higher voltage $u_i$ is induced in the coil, with the peak value $\hat{u}_i$ being greater than that in the steady state. Accordingly, in the transistor T3 there will flow a greater emitter and collector current which, in turn, causes an amplified emitter current of transistor T4. On account of this, the capacitor C1, with respect to the zero point of the circuit, is charged up towards more negative voltages so that, again with reference to the zero point of the circuit, the base potential of the control transistor T2 likewise becomes more negative, so that the threshold voltage of this state is enlarged, i.e. the control transistor T2 is caused to be switched on only later than in the steady state, so that the time of current flow $t_1$ is shortened and the energy supplied to the electromechanical oscillating system, is reduced.

In the case of very strong environmental influences which are the cause of an increased oscillation amplitude it is possible that, owing to the control effect, the operating threshold $U_S$ is displaced to such a strong extent that the control transistor T2 is only driven into saturation after one or more pulses, i.e. only after its amplitude has decreased again owing to the mechanical damping of the oscillator.

If, however, environmental influence upon the oscillation system has such an effect that the amplitude thereof is reduced, then the electrical processes are performed with the opposite sign. In principally the same way the circuit according to FIG. 4, operates similarly with the exception that in this circuit the base biasing potential of the control transistor is not controlled but rather the emitter biasing potential thereof is controlled depending rather upon the freely induced voltage.

The circuit arrangements proposed for carrying out the inventive method can be realized advantageously in the monolithic integrated way, i.e. in the form of a semiconductor solid-state circuit. In the case of the particularly effective circuit arrangement according to FIG. 5 it is possible to provide an integrated component requiring only five external connections or terminals, namely two for the battery voltage and each time one for each end of the coil L and of the capacitors C1 and C2. This number, in the case of the arrangement according to FIGS. 3 and 4, may even be reduced to four terminals, because in these circuits there is only contained one capacitor respectively.

If the monolithic integration of the circuit arrangements is carried out with the individual transistors having the conductivity types as shown in FIGS. 3 to 5, hence when the transistors T1 and T4 are of the PNP-conductivity type, and the transistors T2 and T3 are of the NPN-conductivity type, it is particularly appropriate to design the driving transistor as a substrate transistor, i.e. in such a way that the collector zone thereof is identical to the p-substrate zone common to the entire monolithic integrated circuit. From this there will result a higher current gain factor without any additional technological steps and measures having to be taken.

Finally, in the case of a monolithic integration of the circuit it is proposed that the base-emitter path of an additional transistor is connected appropriately parallel in relation to the base-emitter path of the transistor T4, in which case the collector of this additional transistor T5 is additionally connected to the base thereof. In this case it is appropriate for the PN-junction areas of the additional transistor T5 to be made smaller or at most equal to the PN-junction areas of transistor T4, so that the collector current of transistor T4 becomes more independent of the current-gain factor variations thus causing the capacitors C1 or C2 to be charged in a more defined way.

Owing to the monolithic integrability of the circuit arrangements suitable for carrying out the inventive method and the small number of external connections required in the course of this, these arrangements are in particular suitable for use in wrist watches. Considering the good control properties, however, they can also be advantageously used in such clocks or watches which are operated from a considerably varying battery voltage. For example, a clock designed with the aid of a circuit according to FIG. 5, at battery-voltage variations ranging between 1.1 and 1.6 volts, has proved to have a deviation from the accuracy of less than 5 s/d (seconds per day).

It is to be understood that the foregoing description of specific examples of this invention is made by way of example only and is not to be considered as a limitation on its scope.

I claim:

1. A circuit for controlling the amplitude of oscillation appearing across a coil, including a drive transistor and a control transistor of complementary conductivity type thereto, the collector of said drive transistor being connected to one end of said coil and coupled to the base of said control transistor, the base of said drive transistor being connected to the collector of said control transistor, the emitter of said drive transistor being connected to one supply terminal, the emitter of said control transistor coupled to another supply terminal, and the other terminal of said coil being connected to said other supply terminal comprising:

a first transistor of the same conductivity type as said control transistor;

a second transistor of the same conductivity type as said drive transistor, the base of said second transistor being connected to the collector of said first transistor, the base of said first transistor and the collector of said second transistor being connected to said other supply terminal, the emitter of said first transistor being coupled to the collector of said drive transistor; and a first resistor-capacitor parallel network, one terminal of said first resistor-capacitor network being connected to the emitter of said second transistor and coupled to the base of said control transistor, the other terminal of said resistor-capacitor network being connected to said one supply terminal.

2. A circuit according to claim 1, further comprising:

a second resistor-capacitor parallel network, one terminal of said second resistor-capacitor network being connected to the collector of said second transistor and the emitter of said control transistor, the other terminal of said second resistor-capacitor network being connected to said other supply terminal.

3. A circuit according to claim 1, wherein said one supply terminal is circuit ground.

4. A circuit for controlling the amplitude of oscillation appearing across a coil, including a drive transistor and a control transistor of complementary conductivity type thereto, the collector of said drive transistor being connected to one end of said coil and coupled to the base of said control transistor, the base of said drive transistor being connected to the collector of said control transistor, the emitter of said drive transistor being connected to one supply terminal, the base of said control transistor being coupled to said one supply terminal, the emitter of said control transistor coupled to another supply terminal, and the other terminal of said coil being connected to said other supply terminal comprising:

a first transistor of the same conductivity type as said control transistor;

a second transistor of the same conductivity type as said drive transistor, the base of said second transistor being coupled to the collector of said first transistor, the base of said first transistor being coupled to said other supply terminal, the emitter of said first transistor being coupled to the collector of said drive transistor and the emitter of said second transistor being connected to said one supply terminal; and a first resistor-capacitor parallel network, one terminal of said first resistor-capacitor network being connected to the collector of said second transistor and the emitter of said control transistor, the other terminal of said resistor-capacitor network being connected to said other supply terminal.

* * * * *